United States Patent

[11] 3,625,935

[72] Inventors Gerhard Back
Loerrach, Germany;
Hans Ulrich Schuetz, Basel, Switzerland
[21] Appl. No. 734,525
[22] Filed June 5, 1968
[45] Patented Dec. 7, 1971
[73] Assignee Ciba Limited
Basel, Switzerland
[32] Priority June 9, 1968
[33] Switzerland
[31] 8224/67

[54] 1:2-CHROMIUM COMPLEXES OF A MONOAZO DYESTUFF AND A DISAZO DYESTUFF
8 Claims, No Drawings

[52] U.S. Cl. .................................................. 260/145 A,
8/4, 8/42, 8/71, 117/138.8, 117/144, 260/37,
260/145 B, 260/146 T, 260/151, 260/160,
260/185, 260/191, 260/195
[51] Int. Cl. .................................................. C09b 45/06,
D06p 1/10
[50] Field of Search........................................... 260/145 A,
145 B

[56] References Cited
UNITED STATES PATENTS
2,933,488    4/1960   Biedermann et al..........   260/145

| 2,933,489 | 4/1960 | Biedermann et al.......... | 260/145 |
| 2,933,490 | 4/1960 | Biedermann et al.......... | 260/145 |
| 3,040,019 | 6/1962 | Neier........................... | 260/145 |
| 3,412,081 | 11/1968 | Ackermann.................. | 260/145 |

Primary Examiner—Floyd D. Higel
Attorneys—Harry Goldsmith, Joseph G. Kolodny, Bryant W. Brennan and Edward J. Sites ABSTRACT: Fiber-reactive 1:2-chromium complex compounds containing one atom of metal linked in complex union with a monoazo dyestuff molecule and with a disazo dyestuff molecule containing the grouping

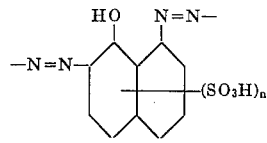

in which $n=1$ or 2, and which further contain one or several fiber-reactive groupings are suitable for dyeing or printing wool, silk, superpolyamide fibers, and polyhydroxylated fibrous structures such as regenerated cellulose and viscose fibers, linen and cotton. The resulting dyeings are even and have good fastness to light, washing, fulling, decatizing, carbonizing and abrasion. The new dyes are valuable to obtain neutral grey and black tints.

1:2-CHROMIUM COMPLEXES OF A MONOAZO DYESTUFF AND A DISAZO DYESTUFF

The present invention provides fiber-reactive 1:2-chromium complex compounds containing one atom of metal linked in complex union with a monoazo dyestuff molecule and with a disazo dyestuff molecule containing the grouping

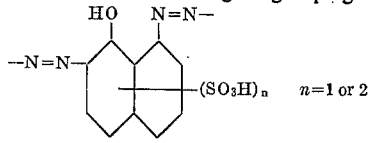

in which $n$ is 1 or 2, and which further contain one or more fiber-reactive groupings. Heretofore and hereinafter, all rings shown in the formulas are aromatic.

The present invention also provides a process for preparing valuable new chromiferous, fiber-reactive azo dyestuffs which comprises condensing a chromium complex compound that comprises one atom of metal bound in complex union with a monoazo dyestuff molecule and with a disazo dyestuff molecule containing the grouping

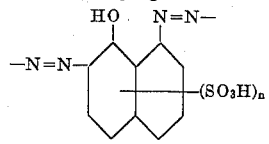

in which $n=1$ or 2, and which comprises in addition an acylatable amino group, with an acylating agent that contains in addition to the acylating position a fiber-reactive grouping.

The parent chromium complex compounds of this invention may be prepared in the following manner:

1. A monoazo dyestuff of the formula (1) $R_1-N=N-R_2$, in which $R_1$ represents an aryl radical which carries a group capable of forming complexes in vicinal position to the azo bridge and $R_2$ represents the residue of a coupling component that couples in vicinal position to a hydroxyl, keto or amino group, is chromed in the usual manner so that 1 1:1-chromium complex compound results which is then reacted with a disazo dyestuff containing the grouping

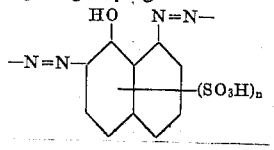

where $n$ is 1 or 2, which must additionally contain an acylatable amino group if the monoazo dyestuff used does not contain such a group.

$R_1$ is preferably a residue of the benzene or naphthalene series, especially a carboxybenzene, hydroxybenzene or naphthol residue, which may contain a wide variety of substituents, for example, halogen atoms or nitro, alkyl, alkoxy and acylamino groups.

$R_2$ may represent the residue of a phenolic, naphtholic or enolic coupling component or a naphthylamino residue.

The monoazo dyestuffs required for the manufacture of the metal compounds to be used in the present process may be prepared, for example, from the following diazo and coupling components; the diazo components are, of course, used in the form of diazonium salts.

Diazo Components 4- or 5-chloro-2-amino-1-oxybenzene, 4-, 5- or 6-nitro-2-amino-1-oxybenzene, 4,6-dichloro-2-amono-1-oxybenzene, 3,4,6-trichloro-2-amino-1-oxybenzene, 4-chloro-5- or -6-nitro-2-amino-1-oxybenzene, 4-nitro-6-chloro-2-amino-1-oxybenzene, 6-nitro-4-methyl-2-amino-1-oxybenzene, 4-nitro-6-acetylamino-2-amino-1-oxybenzene, 6-nitro-4-acetylamino-2-amino-1-oxybenzene, 4,6-dinitro-2-amino-1-oxybenzene, 1-amino-2-oxynaphthalene, 2-aminobenzoic acid, 2-aminobenzene-1-carboxylic acid-4- or -5-sulfonic acid, 2-amino-1-oxybenzene-4- or -5-sulfonic acid, 4-chloro- or 4-methyl-2-amino-1-oxybenzene-5- or -6-sulfonic acid, 6-nitro-2-amino-1-oxybenzene-6-sulfonic acid, 6-nitro-2-amino-1-oxybenzene-4-sulfonicacid and especially naphthalene compounds, for example, 2-amino-1-oxynaphthalene-4- or -8-sulfonic acid, 6-bromo- or 6-methyl-1-amino-2-oxynaphthalene-4-sulfonic acid and especially 1-amino-2-oxynaphthalene-4-sulfonic acid or 6-nitro-1-amino-2-oxynaphthalene-4-sulfonic acid, 4-chloro- or 4-nitro-2-amino-1-oxybenzene-6-sulfonamide, 6-nitro-2-amino-1-oxybenzene-4-sulfonamide, 2-amino-1-oxybenzene-4- or -5-sulfonamide, 2-amino-1-oxybenzene-4- or -5-sulfonic acid phenylamide, 2-amino-1-oxybenzene-4- or -5-sulfonic acid mono- or -dimethylamide, 4-methyl-2-amino-1-oxybenzene-5-sulfonamide, 4-chloro-2-amino-1-oxybenzine-5sulfonic acid methyl-, -ethyl-, -isopropylamide, -phenylamide, 4-chloro-2-amino-1-hydroxybenzene-5-sulfonyl-demethylamide, -diethylamide, -N-methyl-N-phenylamide, -N-methyl-N-β-hydroxyethylamide, -N-β-hydroxyethyl-N-phenylamide or -N-ethyl-N--phenylamide and the corresponding compounds that contain instead of a sulfonamide group a methylsulfone group, an ethylsulfone group or especially a phenylsulfone group, a p-methylsulfone or p-chlorophenylsulfone group.

Coupling Components

Oxybenzenes, for example, p-cresol or p-tertiaryamyl phenol, 4-methyl-2-acetylamino-1-oxybenzene, 4-acetylamino-1-oxybenzene, 4-(β-cyanethyl)-phenene, β-keto carboxylic acid ester or amides, for example, acetoaceticacidanilide and 1-acetoacetylamino-2-, -3- or -4-chlorobenzene, pyrazolones, for example, 1-phenyl-3-methyl-5-pyrazolone, 1,3-diphenyl-5-pyrazolone, 1-(2'-, 3'- or 4'-chlorophenyl)-3-methyl-5-pyrazolone, 1-(2'-, 3'- or 4'-methylphenyl)-3-methyl-5-pyrazolone, 1-(2',5'-dichlorophenyl)-3-methyl-5-pyrazolone, 1-(2'-ethyl- or 4'-ethylphenyl)-3-methyl-5-pyrazolone, 1-(napthyl-(1')- or -(2'))-3-methyl-5-pyrazolone, 1-phenyl-5-pyrazolone-3-carboxylic acid phenyl amide, 1-n-octyl-3-methyl-5-pyrazolone, oxyquinolines, barbituric acid and napthylamines, for example, 6-bromo-, 6-methoxy- or 6-methyl-2-aminonaphthalene, 2-phenyl-aminonaphthalene, 2-aminonaphthalene itself and 2-amino-naphthalone-1-sulfonic acid, which is capable of coupling and, as is known, leads to dyestuffs similar to those produced with 2-aminonaphthalene with the separation of the SO$_3$-H group in the 1-position, especially, however, naphtholes, for example, 6-bromo- or 6-methoxy-2-oxynaphthalene and especially 1-acetylamino-7-oxynaphthalene, 1-n-butyryl-amino-7-oxynaphthalene, 1-benzoylamino-7-oxynaphthalene, 1-carbethoxyamino-7-oxynaphthalene, 8-chloro-1-oxynaphthalene, 5-chloro-1-oxynaphthalene, 5,8-dichloro-1-oxynaphthalene, 4,8- or 5,8-dichloro-2-oxynaphthalene, 2-oxynaphthalene and, if desired, 1-oxynaphthalene, 1-phenyl-3-methyl-5-pyrazolone-2'-, -3'- or -4'-sulfonic acid, 2'-chloro-1-phenyl-3-methyl-5-pyrazolone-4'- or -5'-sulfonic acid, 2',5'-dichloro-1-phenyl-3-methyl-5-pyrazolone-4'- sulfonic acid, 1(naphthyl-(1'))-3-methyl-5-pyrazolone-4'-, -5'-, -6'-, -7'- or -8'-sulfonic acid, 1-(naphthyl-(2'))-3-methyl-5-pyrazolone-6'- or -8'-sulfonic acid, 1-acetoacetylamino-benzene-4-sulfonic acid and especially 2-amino- or 2-oxynaphthalene-4-, -5-, -6- or -7-sulfonic acid, 1-oxynaphthalene-4-, -5- or -8-sulfonic acid, 2-phenyl-aminonaphthalene-3'- or -4'-sulfonic acid, 1-phenyl-3-methyl-5-pyrazolone-3'-sulfonamide or -3'-sulfonic acid methyl amide, amides of 2-aminonaphthalene-4-, -5- or -6-sulfonic acid, of 1-oxynaphthalene-4-, -5- or -8-sulfonic acid or of 2-oxynaphthalene- 4-, -5-, -6- or 7-sulfonic acid, as well as coupling components containing amino groups, for example 1-(3'- or 4'-amino-phenyl)- -3-methyl-5-pyrazolone, 4-amino-1-acetoacetylaminobenzene and especially amino naphthols, for example 1-amino-8-hydroxynaphthalene-3,6- or -4,6-disulfonic acid, 1-hydroxy-5-, -6- or -7-aminonaphthalene-3-sulfonic acid, 1-amino-8-naphthol-4-sulfonic acid, aminobenzoyl-H- and -K-acids.

The 1:1 complexes to be used in the process of the present invention may be obtained by reacting in an acidic medium a monoazo dyestuff which is free from complex-forming metal, advantageously a dyestuff which contains a sulfonic acid group, with an excess of a salt of trivalent chromium, for example, chromium formate, chromium sulfate or chromium fluoride, at the boil or at a temperature above 100° C. For the conversion of the dyestuffs free from metal and containing sulfonic acid groups into the 1:1-complexes it is in general advantageous to form the complexes in known manner, for example, in the presence of an organic solvent for example, an alcohol or formamide. Dealkylating formation of metal complexes is also suitable.

Generally, it is advantageous not to dry the parent dyestuff required for the formation of the 1:2-complex after it has been manufactured and isolated but to use the dyestuff in the form of a moist paste.

The reaction of the 1:1-metal complex with the metal-free disazo dyestuff is advantageously carried out in an aqueous, neutral to weakly alkaline medium under atmospheric or superatmospheric pressure, at room temperature or with heating, for example, at a temperature within the range of from 50° to 120° C. In general, it is advantageous to use as equivalent proportions as possible of the metalliferous 1:1-complex and of the metal-free disazo dyestuff for the reaction.

When the disazo dyestuff does not contain in the final component (designated as $R_4$ the following formula 2) amino or hydroxyl groups in ortho-position to the coupling position, the parent 1:2-chromium complex, which according to this invention is condensed with an acylating agent that contains apart from the acylating position a fiber-reactive grouping, is also accessible by reaction of a 1:1-chromium compound of the disazo dyestuff of the kind defined with a metal-free monoazo dyestuff of the kind defined.

Specially suitable disazo dyestuffs are those of the formula (2)

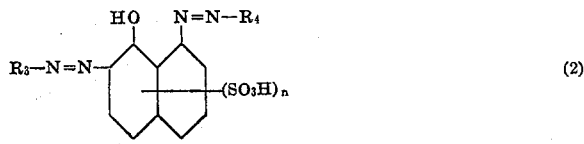

in which $n$ is 1 or 2, $R_3$ represents a benzene residue which contains a hydroxyl or carboxyl group in ortho-position to the azo bridge and $R_4$ represents the residue of a coupling component which is able by the presence of a hydroxyl, keto or amino group, which is advantageously in vicinal position to the coupling position, to couple. Thus, $R_3$ may be identical to $R_1$, and $R_3$ is in the first place a residue of the diazo components mentioned in defining the residue $R_1$. $R_4$ may represent the residue of a p-coupling amine, for example, aniline, toluidine, cresidine or one of the coupling components mentioned in defining the residue $R_2$.

As acylating agents, which according to this invention are to be coupled with the 1:2-chromium mixed complexes containing an acylatable amino group, suitable aromatic halides (for example nitrochlorobenzene sulfonyl chloride or carboxylic acid chloride), for example, preferably aliphatic or heterocyclic acylating agents are suitable. From among the aliphatic acylating agents there may be specially named:

α,β-dibromopropionic acid chloride or -bromide, chloroacetylchloride, β-chloropropionic acid chloride, α- or β-bromacrylic acid chloride, acrylic acid chloride, chlorocrotonic acid chloride, propiolic acid chloride, chloromaleic acid anhydride, β-phenylsulfonylpropionic acid chloride, tetra-fluorocyclobutane carboxylic acid chloride. It is advantageous to use heterocycles containing labile groups (for example sulfonyl groups) and/or halogen atoms bound, for example, to a heterocycle containing two or three nitrogen atoms as hetero atoms in a five- or six-membered ring, or halides of aliphatic halogenated sulfonic or carboxylic acids. The following is an incomplete list of such acylating agents:

2-halogenobenzthiazole- or -oxazole carboxylic or sulfonic acid chloride, 4,5-dichloro-1-phenylpyridazonecarboxylic or sulfonic acid chloride, 4,5-dichloro-1-phenylpyridazonepropionic acid chloride, 1,4-dichlorophthalazine carboxylic or sulfonic acid chloride, 2,3-dichloroquinoxaline carboxylic or sulfonic acid chloride, 2,4-dichloroquinoxaline carboxylic or sulfonic acid chloride, 2,4,6-trichloro- or 2,46-tribromopyrimidine and their derivatives, which carry a cyano, nitro-, methyl-, ethyl-, carbamide-, sulfamide-, carbomethoxy-, carbalkoxy-, acyl- (for example, benzoyl-, acetyl- or propionyl-), alkenyl- (for example, allyl- or chlorvinyl-), or a substituted alkyl- (for example, carboxymethyl-, chloromethyl- or bromoethyl-) group in, for example, the 5-position. 2,4,5,6-tetrachloro- or 2,4,5,6-tetrabromopyrimidine, 2,6-dichloro- or 2,6-dibromo-4-carboethoxypyrimidine, 2,4,5-trichloropyrimidine, 2,4-dichloropyrimidine-6-carboxylic acid chloride, 2,4-dichloropyrimidine-5-carboxylic acid chloride, 2,6-dichloropyrimidine or 2,6-dibromopyrimidine-4- or -5-carboxylic acid amide, or -4- or -5-sulfonic acid amide, 2,4-dichloro-5-chloromethyl-6-methyl-pyrimidine, 2,4-dibromo-5-bromomethyl-6-methylpyrimidine, 2,4-dichloro-5-chloromethylpyrimidine, 2,4-dibromo-5-bromomethylpyrimidine,2,5,6-trichloro-4-methylpyrimidine or 2,6-dichloro-4-trichloromethylpyrimidine, 4,6-dimethylsulfonyl-2-chloro (or methylsulfonyl)-pyrimidine, 2,4-dichloro-5-methylsulfonyl-6-methylpyrimidine, 2,4,6-trichloro-1,3,5-triazine respectively 2,4,6-tribromo-1,3,5-triazine, 3,6-dichloropyridazine-5-carboxylic acid chloride, tetrachloropyridazine, and 4,6-dichloro-1,3,5-triazines substituted in position 2 by an aryl or alkyl group, for example, a phenyl, methyl or ethyl group, or by the residue of an aliphatic or aromatic mercapto compound linked through the sulfur atom or hydroxy compound linked through the oxygen atom, or especially by an —$NH_2$—group or by the residue of an aliphatic, heterocyclic or aromatic amino compound linked through the nitrogen atom. As such compounds, whose residues may be linked in position two on the triazine nucleus by reaction with trihalogenotriazines, there may be mentioned, for example, the following:

aliphatic or aromatic mercapto- or hydroxyl compounds for example, thioalcohols, thioglycol acid, thiourea, thiophenol, methyl-, ethyl-, isopropyl alcohol, glycolic acid, phenol, chloro- or nitrophenol, phenolcarboxylic- and sulfonic acids, naphthols and naphtholsulfonic acids, especially however ammonia and acylatable amino groups including compounds, for example, hydroxylamine, hydrazine, phenylhydrazine, phenylhydrazine sulfonic acid, carbarmic acid and its derivatives, semi- and thiosemicarbazides and -carbazones, methyl-, ethyl-, isopropyl-, methoxyethyl-, methoxypropylamine, dimethyl-, diethyl-, methylphenyl-, ethylphenylamine, chlorethylamine, ethanol-amine, propanolamine, benzylamine, cyclohexylamine, morpholine, piperidine, piperazine, aminocarbonic acid ester, aminoacetic acid ethylester, aminoethylsulfonic acid, N-methylaminoethylsulfonic acid, especially, however, aromatic amines, for example, aniline, N-methylaniline, toluidines, xylidines, chloroanilines p- or m-aminoacetanilide, nitroanilines, aminophenols, nitrotoluidines, phenylenediamines, toluylenediamines, anisidine, phenetidine, diphenylamine, naphthylamine, aminonaphthols, diaminonaphthalenes, and especially acidic groups containing anilines, for example, sulphanil-, metanil-, orthanilic acid, anilindisulphonic acid, anilin-ω-methansulfonic acid, aminodibenzoic acid, naphthylaminomono-, di- and trisulfonic acids, aminobenzoic acids, for example, 2-oxy-5-aminobenzoic acid, aminonaphtholmono-, and -di- and -trisulfonic acids.

The triazine residues substituted in position 2 by the residue of a hydroxy, mercapto or amino compound or ammonia may be advantageously also introduced by first reacting the manufactured 1:2-chromium complex compound with a 2,4,6-trihalogeno-1,3,5-triazine, especially cyanuric chloride, and then replacing one halogen atom in the resulting dihalogenotriazine residue(s) by reaction with one or several different of the compounds mentioned above.

Furthermore, in a dyestuff manufactured as described above, that contains a β-chloropropionyl, α,β-dichloropropionyl or -dibromopropionyl residue, such a residue may subsequently be converted according to this invention into an unsaturated acyl radical, for example, an acryl, a chloroacryl or bromoacryl group, by dehydrohalogenation with an alkaline agent. 2. According to a variation of the present process for the manufacture of the new chromiferous, fiber-reactive azo dyestuffs, the 1:1-chromium complex of the monoazo dyestuff is acylated with one of the aforementioned acylating agents and then reacted with the disazo dyestuff. According to another variation the disazo dyestuff molecule may first be condensed with one of the aforementioned acylating agents and then converted into the 1:2-chromium complex compound of this invention with the 1:1-chromium complex of the monoazo dyestuff.

The new chromiferous, reactive, mixed complexes obtained by the present process and its variants, are suitable for dyeing or printing a wide variety of materials, for example, silk, wool, superpolyamide fibers, and more especially polyhydroxylated materials of fibrous structure, including both synthetic fibers, for example, of regenerated cellulose or viscose fibers, and natural materials, for example, linen and especially cotton. Many of these dyestuffs display even in a weakly acidic to acidic bath a high affinity for the said nitrogenous materials so that they deposit well on them. The resulting dyeings, especially those on wool, are even and are distinguished by their good fastness to light, washing, fulling, decatizing, carbonizing and abrasion.

Suitable cellulose dyestuffs are especially those dyestuffs which contain in every dyestuff molecule two to four sulfo groups; they are suitable for dyeing cellulose by the direct dyeing method from a dilute dyebath or by padding by the so-called pad dyeing method, according to which the cellulose is impregnated with an aqueous, if desired, salted, dyestuff solution and the dyestuffs are fixed on the material by an alkali treatment, preferably at an elevated temperature. This process furnishes dyeings that are as a rule distinguished by good fastness to light, and especially excellent wet fastness properties.

When cellulose fibers are printed, valuable, fast prints are also obtained when the dyestuffs are fixed on the material by a heat treatment in the presence of, for example, sodium bicarbonate, potassium carbonate or an alkali hydroxide solution.

Compared with the known manufacturing processes the present process is further distinguished by the fact that it produces dyestuffs of remarkable chemical uniformity and by their valuable neutral grey and black tints.

It is advantageous to remove after dyeing or printing any unfixed dyestuff as completely as possible. For this purpose the dyeing or prints are thoroughly rinsed in warm and cold water and then soaped in the presence of a nonionic dispersant and/or wetting agent, or they may be neutralized by addition of ammonia.

The following examples illustrate the invention. Unless otherwise indicated, parts and percentages in the following examples are by weight.

EXAMPLE 1

47.35 parts of the monoazo dyestuff obtained by alkaline coupling of 1-amino-8-hydroxynaphthalene-3,6disulfonic acid with diazotized 1-hydroxy-2-amino-4-chlorobenzene in the usual manner are stirred with 500 parts by volume of water and 10 parts by volume of 30 percent sodium hydroxide solution. The resulting solution is mixed with 25 parts by volume of a 4N-sodium nitrite solution and then dropped into a mixture of of parts by volume of 36 percent hydrochloric acid, 100 parts by volume of water and 200 parts of ground ice during one hour. The resulting suspension is further stirred for 2 hours at 0° to 5° C., freed from a slight excess of nitrous acid, which might be present, by addition of sulfamic acid, and then stirred into a solution of 15 parts of 2-hydroxy-naphthalene and 70 parts of anhydrous sodium carbonate in 300 parts by volume of water, 200 parts of ice and 10 parts by volume of a 30 percent sodium hydroxide solution.

When the coupling is completed, the completely precipitated disazo dyestuff is filtered off, washed with dilute sodium chloride solution and expressed. The paste (corresponding to 62.85 parts of the above disazo dyestuff) and 52.35 parts of the 1:1-chromium complex of the monoazo dyestuff which can be obtained by a method known per se from diazotized 1-hydroxy-2-amino-4-chlorobenzene and 1-amino-8-hydroxynaphthalene-3,6-disulfonic acid are stirred with 750 parts of water of 60° C. The pH is adjusted to a steady value of 9 by dropping in a dilute sodium hydroxide solution and the mixture is stirred and heated to 90° to 95° C. When neither of the two starting components can be identified in the resulting clear solution, the whole is cooled to 0° to 3° C. and neutralized with dilute hydrochloric acid. Then a solution of 27.5 parts of $\alpha,\beta$-dibromopropionylchloride in 100 parts by volume of acetone is dropped in with vigorous stirring and while cooling in an ice bath, and by simultaneous addition of dilute sodium hydroxide solution the mixture is maintained at a pH value of 6 to 7. When diazotizable amino groups can no longer be identified in the deep black, clear reaction solution, the dyestuff is precipitated by adding potassium chloride, filtered off, washed with concentrated potassium chloride solution and dried under vacuum at 60° C.

The new dyestuff is obtained in form of a very readily water-soluble dark powder; it dyes wool in the presence of ethylene adducts with higher alcohols or amines, full grey-violet to black tints.

EXAMPLE 2

A solution, prepared as described in example 1, of the uniform mixed complex acylated with $\alpha,\beta$-dibromopropionylchloride is mixed with 10 parts by volume of 30 percent sodium hydroxide solution while maintaining a temperature of 15° C. and stirred for 15 minutes at a pH value of 12. The deep black solution is then neutralized with dilute hydrochloric acid, and the dyestuff is precipitated with potassium chloride, filtered off and dried under vacuum at 60° C.

The resulting dyestuff is readily soluble in water, and its tinctorial behavior is similar to that of the dyestuff described in example 1.

EXAMPLE 3

48.4 parts of the monoazo dyestuff obtained by a method per se by alkaline coupling of 1-amino-8-hydroxynaphthalene-3,6disulfonic acid with diazotized 1-hydroxy-2-amino-4-nitrobenzene are stirred with 500 parts by volume of water and 10 parts by volume of 30 percent sodium hydroxide solution. The resulting solution is mixed with 25 parts by volume of a 4N-sodium nitrite solution and within 1 hour dropped into a mixture of 70 parts by volume of 36 percent hydrochloric acid, 100 parts by volume of water and 200 parts of ground ice. The resulting suspension is stirred for 2 hours at 0° to 5° C., freed from a slight excess of nitrous acid with sulfamic acid, and the whole is then stirred into a solution of 15 parts of 2-hydroxynaphthalene and 70 parts of anhydrous sodium carbonate in 300 parts by volume of water, 200 parts of ice and 10 parts by volume of 30 percent sodium hydroxide solution. When the coupling is completed, the quantitatively precipitated disazo dyestuff is filtered off, washed with dilute sodium chloride solution and expressed.

The paste (corresponding to 63.9 parts of the above disazo dyestuff) and 52.35 parts of the 1:1-chromium complex, prepared by a method known per se, of the monoazo dyestuff from diazotized 1-hydroxy-2-amino-4-chlorobenzene and 1-amino-8-hydroxynaphthalene-3,6-disulfonic acid are stirred with 750 parts of volume of water of 60° C. The pH is adjusted to a constant value of 9 by dropping in a dilute sodium hydroxide solution and the mixture is then heated to 90° to 95° C. while being stirred. When no starting component can be identified in the resulting clear solution, it is cooled to 0° to 3° C. and neutralized with dilute hydrochloric acid. Then a solution of 19 parts of cyanuric chloride in 100 parts by volume of acetone is added and the whole stirred on for some hours at 0° to 5° C., while maintaining a constant pH value below 7 by dropping in dilute sodium hydroxide solution. When diazotizable amino groups can no longer be identified in the clear solution, a neutral solution of 19 parts of 1-aminobenzene-3-sulfonic acid in 500 parts of water is added and the batch heated to 35° to 40° C. and stirred for a few hours at this temperature while maintaining the pH value at 6.0 to 7 by dropping in more dilute sodium hydroxide solution.

When sodium hydroxide solution is no longer being consumed, the dyestuff is salted out with potassium chloride, filtered, washed with concentrated potassium chloride solution and dried at 50° C., whereupon the new dyestuff is obtained in form of a dark powder which readily forms a blue-black solution in water. It dyes cellulosic materials by the dyeing method described very fast, deep black tints.

EXAMPLE 4

48.4 parts of the monoazo dyestuff obtained in the usual manner by alkaline coupling of 1-amino-8-hydroxynaphthalene-3,6-disulfonic acid with diazotized 1-hydroxy-2-amino-4-nitrobenzene are diazotized as described in example 3. The suspension of the diazo compound is stirred dropwise into a solution, cooled at 5° C., of 19 parts of 1-(4'-aminophenyl)-3-methyl-5-pyrazolone and 80 parts of anhydrous sodium carbonate in 300 parts by volume of water and 5 parts by volume of a 30 percent solution of sodium hydroxide. When the coupling is completed, the completely precipitated disazo dyestuff is filtered off, washed with dilute sodium chloride solution and expressed.

52.35 parts of the 1:1-chromium complex, prepared by a method known per se, of the monazo dyestuff from diazotized 1-hydroxy-2-amino-4-chlorobenzene and 1-amino-8-hydroxynaphthalene-3,6-disulfonic acid are dissolved at room temperature in 1,000 parts by volume of water. The batch is then cooled to 0° to 5° C. and a solution of 19 parts of cyanuric chloride in 100 parts by volume of acetone is added. During a few hours at 0° to 5° C. sufficient sodium hydroxide solution is stirred in dropwise to maintain the pH value of the solution constant below 7. When diazotizable amino groups can no longer be identified, a neutral solution of 19 parts of 1-aminobenzene-3-sulfonic acid in 500 parts of water is added and the mixture heated to 35° to 40° C., then heated for a few hours longer at this temperature while maintaining its pH value at 6.0 to 7 by dropping in more of the dilute sodium hydroxide solution, until sodium hydroxide is no longer being consumed.

The paste of the above-mentioned disazo dyestuff is stirred into the resulting solution of the 1:1-chromium complex, and the mixture is stirred at 35° to 40° C. until neither of the two parent components can be identified. At the same time the pH value of the resulting solution is maintained at 7 by dropping in dilute sodium hydroxide solution.

The deep-green solution of the unitary mixed complex dyestuff is then cooled to 0° to 5° C. and acylated with α,β-dibromopropionylchloride as described in example 2. When diazotizable amino groups can no longer be identified in the resulting greenish black reaction solution, the dyestuff is salted out with potassium chloride, filtered off, washed with concentrated potassium chloride solution and dried under vacuum at 50° C.

The new dyestuff is obtained as a dark powder; it is very readily soluble in water and produces on cotton and wool by the dyeing methods described above olive-grey tints having very good fastness properties.

The following table contains further examples of similar mixed complexes accessible from the 1:1-chromium complex of the dyestuff listed in column I and the corresponding dyestuff in column II by acetylating the compound in column III. The tint obtained on cotton or wool with the mixed complex is shown in each case in column IV.

| I | II | III | IV shade |
|---|---|---|---|
| [Structure: OH, OH, NH₂ substituted naphthalene-azo-benzene with HO₃S, SO₃H, NO₂] | [Structure with COOH, OH, N=N, HO₃S, SO₃H] | Acrylic acid chloride | Grey. |
| [Structure: OH, OH, NH₂ substituted naphthalene-azo-benzene with HO₃S, SO₃H, Cl] | [Structure with OH, OH, N=N, HO₃S, SO₃H, NO₂] | α-Bromacrylic acid chloride. | Do. |
| Same as above | Same as above | 2,4,5,6-tetrachloropyrimidine. | Do. |
| [Structure: OH, OH, NH₂ substituted naphthalene-azo-benzene with Cl, SO₃H] | [Structure with OH, OH, N=N, HO₃S, SO₃H, NO₂] | Chloroacetylchloride | Violet-grey. |

| I | II | III | IV shade |
|---|---|---|---|
| [structure: OH, OH, NH₂ naphthalene with NO₂, HO₃S, SO₃H] | [structure with HO, CH₃, O, NH-cyclohexyl group] | ...do... | Bluish-dark green. |
| Same as above | Same as above | Cyanidechloride | Do. |
| Do | [structure with OH, Cl groups] | β-Chloropropionyl-chloride. | Grey. |
| Do | [structure with H₂N naphthalene] | α,β-Dibromopropionyl-chloride. | Greenish grey. |
| Do | [structure with HO naphthalene, Cl] | Chloroacetylchloride | Reddish-grey. |
| Do | Same as above | Dibrompropionic acid chloride. | Reddish-grey. |
| Do | [structure with OH, Cl, SO₃H, HO] | Acrylic acid chloride | Violet-grey. |
| Do | Same as above | α-Bromacrylic acid bromide. | Do. |
| Do | [structure with HO, OH, NO₂] | Dibromopropionic acid chloride. | Reddish-grey. |
| [structure: OH, OH, NH₂ with NO₂, HO₃S, SO₃H] | Same as above | Dibromopropionyl-chloride. | Bluish-grey. |
| Do | ...do... | Acrylic acid chloride | Do. |

| I | II | III | IV shade |
|---|---|---|---|
| (structure) | (structure) | Dibromopropionic acid chloride. | Grey. |
| (structure) | (structure) | ...do... | Grey-violet. |
| (structure) | (structure) | β-Chloropropionyl-chloride. | Greenish-grey. |
| (structure) | (structure) | α,β-Dibromopropionyl-chloride. | Olive. |
| (structure) | (structure) | α-Bromoacrylic acid chloride. | Brown. |
| (structure) | Same as above | Acrylic acid chloride | Dark green. |
| | (structure) | Chloroacetylchloride | Bluish dark green. |
| | (structure) | ...do... | α,β-Dibromopropionyl-chloride. Bluish olive. |

| I | II | III | IV shade |
|---|---|---|---|
| (structure) | (structure) | Cyanidechloride | Reddish grey. |
| (structure) | (structure) | α,β-Dibromopropionyl- chloride. | Grey. |
| (structure) | (structure) | Chloroacetylchloride | Reddish grey. |
| (structure) | (structure) | α,β-Dibromopropionic acid chloride. | Black. |
| (structure) | (structure) | Acrylic acid chloride | Do. |
| (structure) | (structure) | Chloroacetylchloride | Do. |
| (structure) | (structure) | β-Chloropropionic acid chloride. | Do. |
| Same as above | (structure) | α,β-Dibromopropionic acid chloride. | Blue-black. |

| I | II | III | IV shade |
|---|---|---|---|
| Do | [structure: OH-phenyl(NO2)(HO3S)-N=N-naphthol(HO)(SO3H)-N=N-naphthol(HO)] | β-Bromoacrylic acid chloride. | Black. |
| [structure: OH-phenyl(NO2)(HO3S)-N=N-naphthol(HO)(SO3H)-NH2] | [structure: OH-phenyl(NO2)(HO3S)-N=N-naphthol(HO)(SO3H)-N=N-naphthol(HO)] | 6-methoxy-2,4-dichloro-triazine. | Do. |
| Same as above | [structure: OH-phenyl(O2N)(HO3S)-N=N-naphthol(HO)(SO3H)-N=N-naphthol(HO)] | α,-βDibromopropionic acid chloride. | Do. |
| [structure: OH-phenyl(O2N)(Cl)(HO3S)-N=N-naphthol(HO)(SO3H)-NH2] | [structure: OH-phenyl(NO2)(HO3S)-N=N-naphthol(HO)(SO3H)-N=N-naphthol(HO)] | Acrylic acid chloride | Do. |
| [structure: HO3S-naphthol(OH)(NO2)-N=N-phenol(HO)] | [structure: OH-phenyl(NO2)(HO3S)-N=N-naphthol(HO)(SO3H)-N=N-naphthol(HO)(HO3S)-NH2] | Chloroacetylchloride | Brown-black. |
| [structure: OH-phenyl(NO2)(HO3S)-N=N-naphthol(HO)(SO3H)-NH2] | Same as above | α,β-Dibromopropionic acid chloride. | Black. |
| Do | do | 6-methoxy-2,4-dichloro-triazine. | Do. |

Dyeing Instruction (wool)

100 parts of knitting wool are immersed at 50° to 80° C. in a dyebath containing in 3,000 parts of water 10 parts of crystalline sodium sulfate, 6 parts of 40 percent acetic acid, 0.5 part of the adduct of oleylamine and ethylene oxide described under A, and 2 parts of the dyestuff described in example 1. The dyebath is heated to the boil during half an hour and dyeing is performed for 1 hour at the boil. The wool is then rinsed and dried. A level grey dyeing is obtained.

Manufacture of the Ethylene Oxide Adduct 100 parts of commercial oleylamine are mixed with 1 part of finely divided sodium and heated to 140° C., whereupon ethylene oxide is introduced at 135° to 140° C. When ethylene oxide is being consumed rapidly, the reaction temperature is lowered to 120° to 125° C. and the introduction of ethylene oxide is continued until 113 parts thereof have been absorbed. The resulting reaction product gives a substantially clear solution in water.

Pad Dyeing Method and Fixing on Cellulose With Dry Heat 3 parts of dyestuff, 2 parts of sodium carbonate (or 3 parts of sodium bicarbonate) and 25 parts of urea are dissolved in 75 parts of water, and this solution is used for impregnating a cotton fabric which is then expressed to a weight increase of 75 percent and dried at 80° C. The fabric is then exposed to dry heat of 140° C. for about 5 minutes, rinsed and soaped at the boil. The dyeing obtained is fast to washing at the boil.

Printing Instruction

A solution of 10 parts of dyestuff and 30 parts of urea in 54 parts of water is stirred into 100 parts of a 5 percent sodium alginate thickening and 6 parts of sodium bicarbonate are added. A cotton fabric is printed with the resulting printing paste in the usual manner, then dried and treated for 8 minutes with saturated steam at 100° C. After rinsing in cold and hot water a deep black print is obtained which has been fixed so as to make it fast to washing at the boil.

We claim:

1. A fiber-reactive 1:2-chromium complex compound wherein the chromium atom is bound to one molecule of a monoazo compound of the formula

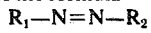
$R_1—N=N—R_2$ and one molecule of a disazo compound of the formula

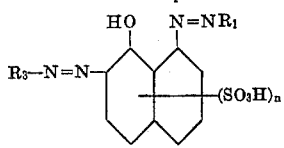

in which $R_1$ is unsubstituted or substituted hydroxy benzene or naphthalene wherein hydroxy is in a position vicinal to azo, and substituents are members selected from the group consisting of chloro, nitro and sulfo; $R_2$ is (a) unsubstituted or substituted hydroxy or amino naphthalene wherein hydroxy or amino are in a position vicinal to the azo bridge and substituents are members selected from the group consisting of amino and sulfo, (b) 1-phenyl-3-methyl-5-pyrazolone linked in the four-position with the azo bridge or (c) acetoacetylaminophenyl linked in a position vicinal to the keto group with the azo bridge; $n$ is 1 to 2; $R_3$ is unsubstituted or substituted hydroxy or carboxy benzene wherein hydroxy or carboxy are in the ortho position to the azo bridge and substituents are members selected from the group consisting of chloro and nitro; and $R_4$ is unsubstituted or substituted amino or hydroxy naphthalene wherein amino or hydroxy are in a position vicinal to the azo bridge and substituents are members selected from the group consisting of chloro, amino and sulfo, (d) unsubstituted or substituted 1-phenyl-3-methyl-5-pyrazolone linked in four-position with the azo bridge and wherein the phenyl substituent is amino, or (e) acetyacetylaminophenyl linked in a position vicinal to the keto group, and wherein said 1:2-chromium complex is bonded by one to two fiber-reactive aliphatic, saturated or unsaturated carboxylic acids containing two to three carbon atoms and substituted by one to two chlorine or bromine atoms, chloro- or bromo-pyrimidines or chloro- or bromo-triazines.

2. A fiber-reactive 1:2-chromium complex compound as claimed in claim 1, in which $R_4$ represents the radical

3. A fiber-reactive 1:2-chromium complex compound as claimed in claim 1 in which the chromium atom is bound to a monoazo dyestuff of the formula

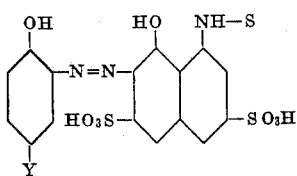

wherein Y is chlorine or $NO_2$ and Z the radical of an aliphatic saturated or unsaturated carbocyclic acid which contains two to three carbon atoms and one to two chlorine or bromine atoms, and which is bound to the NH—bridge through its CO—group.

4. The complex chromium compound which contains one atom of chromium in complex combination with one molecule of each of the two dyestuffs of the formula

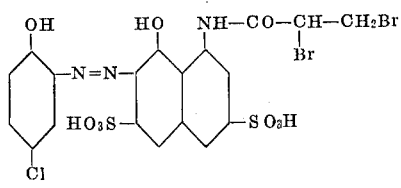
and
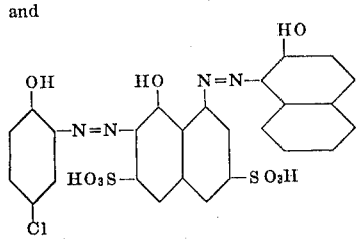

5. The complex chromium compound which contains one atom of chromium in complex combination with one molecule of each of the two dyestuffs of the formula

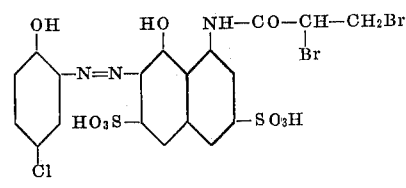
and
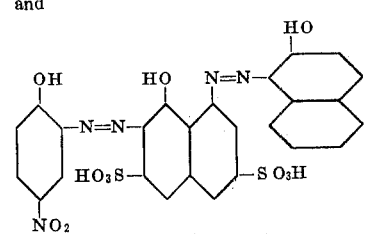

6. The complex chromium compound which contains one atom of chromium in complex combination with one molecule of each of the two dyestuffs of the formula

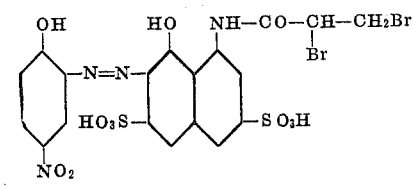
and
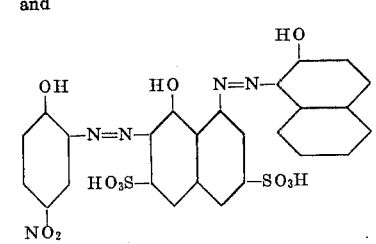

7. The complex chromium compound which contains one atom of chromium in complex combination with one molecule of each of the two dyestuffs of the formulas

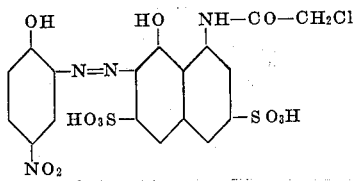
and
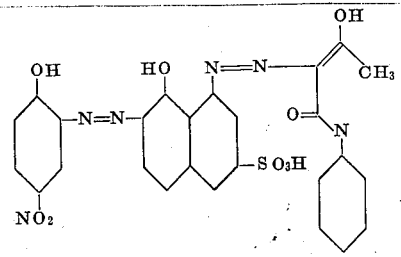
8. The complex chromium compound which contains one atom of chromium in complex combination with one molecule of each of the two dyestuffs of the formulas
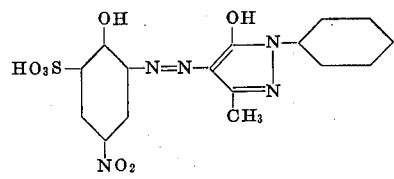
and
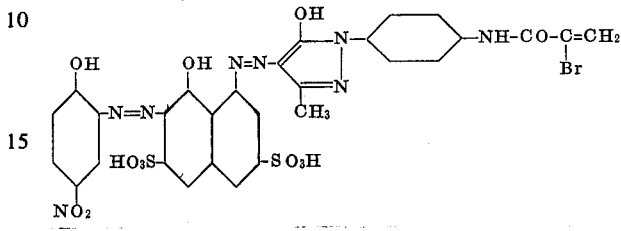
* * * * *